(12) United States Patent
Hill

(10) Patent No.: US 6,563,593 B2
(45) Date of Patent: May 13, 2003

(54) DYNAMIC ANGLE MEASURING INTERFEROMETER

(75) Inventor: Henry Allen Hill, Tucson, AZ (US)

(73) Assignee: Zygo Corporation, Middlefield, CT (US)

(*) Notice: Subject to any disclaimer, the term of this patent is extended or adjusted under 35 U.S.C. 154(b) by 0 days.

(21) Appl. No.: 09/842,556

(22) Filed: Apr. 26, 2001

(65) Prior Publication Data

US 2002/0033951 A1 Mar. 21, 2002

Related U.S. Application Data

(60) Provisional application No. 60/207,747, filed on May 30, 2000, and provisional application No. 60/201,457, filed on May 3, 2000.

(51) Int. Cl.[7] ................................................. G01B 9/02
(52) U.S. Cl. ...................................... 356/510; 356/491
(58) Field of Search ............................... 356/450, 484, 356/485, 487, 491, 492, 510, 519

(56) References Cited

U.S. PATENT DOCUMENTS

| | | |
|---|---|---|
| 4,681,448 A | 7/1987 | Wertz |
| 4,915,502 A | 4/1990 | Brierley |
| 4,969,744 A | 11/1990 | Ordell |
| 5,064,289 A | 11/1991 | Bockman |
| 5,128,798 A * | 7/1992 | Bowen et al. ............... 356/519 |
| 5,245,408 A * | 9/1993 | Cohen .......................... 356/491 |
| 6,075,598 A | 6/2000 | Kauppinen |

* cited by examiner

Primary Examiner—Drew A. Dunn
(74) Attorney, Agent, or Firm—Francis J. Caufield

(57) ABSTRACT

Apparatus and method for interferometric measurement of a change in the relative directions of propagation of components of an optical beam, for interferometric measurement of a change in the direction of propagation of an optical beam, and for interferometric measurments of the change in orientation of an object. An interferometer is arranged to intercept light beams to produce an output beam from which a detector generates an electrical signal having a phase that varies in at least one plane in accordance with the angular separation between the beams. Electronic processing determines the phase and converts it to the angle separating the light beams.

12 Claims, 17 Drawing Sheets

DYNAMIC ANGLE MEASURING INTERFEROMETER

CROSS REFERENCE TO RELATED APPLICATION

This application claims priority from U.S. Provisional Patent Application No. 60/201,457 filed on May 3, 2000 and U.S. Provisional Patent Application No. 60/207,747 filed on May 30, 2000 the disclosures of which are incorporated by reference herein in their entirety.

BACKGROUND OF THE INVENTION

This invention generally relates to interferometry and more particularly to interferometric apparatus and methods by which highly precise metrology is practiced.

In highly precise metrology, it is required to understand and compensate for changes in the direction of propagation of various individual light beams in which information is encoded about distances or angles under measurement. Changes in the direction of propagation of such beams or in their angular relationships with respect to one another or some reference are often introduced by pitch, yaw, and roll of various optical components in the interferometer as, for example, those that might be experienced by a quickly slewing planar measurement mirror in a plane mirror interferometer, or the like. If such effects are not compensated, it is often not possible to achieve the desired precision required of important industrial applications such as those practiced in the fabrication of semiconductor devices.

In addition, where interferometers have dynamic elements that may be used to control the direction of propagating beams, some means for measuring errors in beam direction and a measurement of a change in an angle is needed to provide feedback signals for controlling such elements.

Consequently, it is a primary object of the present invention to provide apparatus and methods for measuring and/or controlling the differential direction of propagation and/or angular attitude among one or more light beams.

It is another object of this invention to provide apparatus and methods by which changes in the direction of propagation and/or angular relationships among one or more light beams may be measured with interferometric precision.

It is another object of this invention to provide apparatus and methods by which changes in the angular orientation of an object may be measured with interferometric precision.

Other objects of the invention will in part appear hereinafter and will in part be obvious when reading the following detailed description in connection with the accompanying drawings.

SUMMARY OF THE INVENTION

The present invention relates to apparatus and method(s) for interferometric measurement of a change in the relative directions of propagation of components of an optical beam, for interferometric measurement of a change in the direction of propagation of an optical beam, and for interferometric measurements of the change in orientation of an object.

In one aspect, the invention comprises apparatus for measuring differences between the angular directions of travel of light beams and comprises a multiple beam interferometer, the multiple beam interferometer being arranged to intercept the light beams to produce an output beam; a lens for focusing the output beam to a spot in a detector plane; and a detector located in the detector plane for receiving the focused output beam and generating an electrical signal having a phase that varies in at least one plane in accordance with the angular separation between the light beams; and electronic means for receiving the electrical signal, determining the phase therefrom, and converting the phase to the angle separating the light beams.

In another aspect, optical alignment means are provided for assuring that at least one of said light beams enters the multiple beam interferometer aligned in a predetermined attitude with respect to the multiple beam interferometer such that the phase of said electrical signal is insensitive to changes in the angular direction of travel of the at least one of the light beams aligned in the predetermined attitude with respect to the multiple beam interferometer whereby the multiple beam interferometer serves as a reference from which an angular change of the other light beam may be measured.

Another aspect includes means for modulating an optical path length in the multiple beam interferometer so that the phase of the electrical signal varies with the frequency of modulation, the amplitude of the modulation, the optical path length in the multiple beam interferometer, and the angular separation between the light beams.

Another aspect includes means for providing a feedback signal derived from the electrical signal and for adjusting the optical path length of the multiple beam interferometer to optimize the magnitude of the electrical signal such that it is optimal at an optical path length where the optical path length of the multiple beam interferometer is an integer multiple of $2\pi$ at the operating wavelengths of the light beams.

Another aspect includes a distance measuring interferometer for measuring the optical path length of the multiple beam interferometer as the optical path length of the multiple beam interferometer is adjusted.

Another aspect provides the electronic means with means for determining the relative angle between the light beams when the electrical signal has been optimized.

Another aspect involves various steps of method(s) for measuring differences between the angular directions of travel of light beams.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein.

DESCRIPTION OF INVENTION

The invention is an interferometric apparatus and method for measuring and monitoring changes in the relative directions of propagation of optical beam components in a plane or in two orthogonal planes and for measuring and monitoring changes in the direction of propagation of an optical beam and for establishing and/or measuring an angle between the directions of propagation of two beams.

Eight embodiments and variants thereof of the present invention are described herein. The first and fifth embodiments and variants thereof measure changes in the angle between the directions of propagation of two beam components in one plane. The second embodiment measures changes in the direction of propagation of a beam component in one plane relative to a direction fixed by the apparatus of the second embodiment. The third embodiment and variant thereof measures changes in the direction of propagation of a beam in one plane relative to a direction fixed by the apparatus of the third embodiment. The fourth embodiment and variant thereof determines interferometrically when an angle between the directions of propagation of two beams in a given plane is the same as a predetermined value according to an end use application and/or measures in a given plane the angle between the directions of propagation of two beams. The fifth embodiments and variant thereof measure changes in angle between the direction of two beam components in one plane. The sixth embodiment and variant thereof measure changes in the angle between the directions of propagation of two beam components in two orthogonal planes. The seventh and eighth embodiments measure interferometrically the change in orientation of an object in one plane.

Figure 1A:
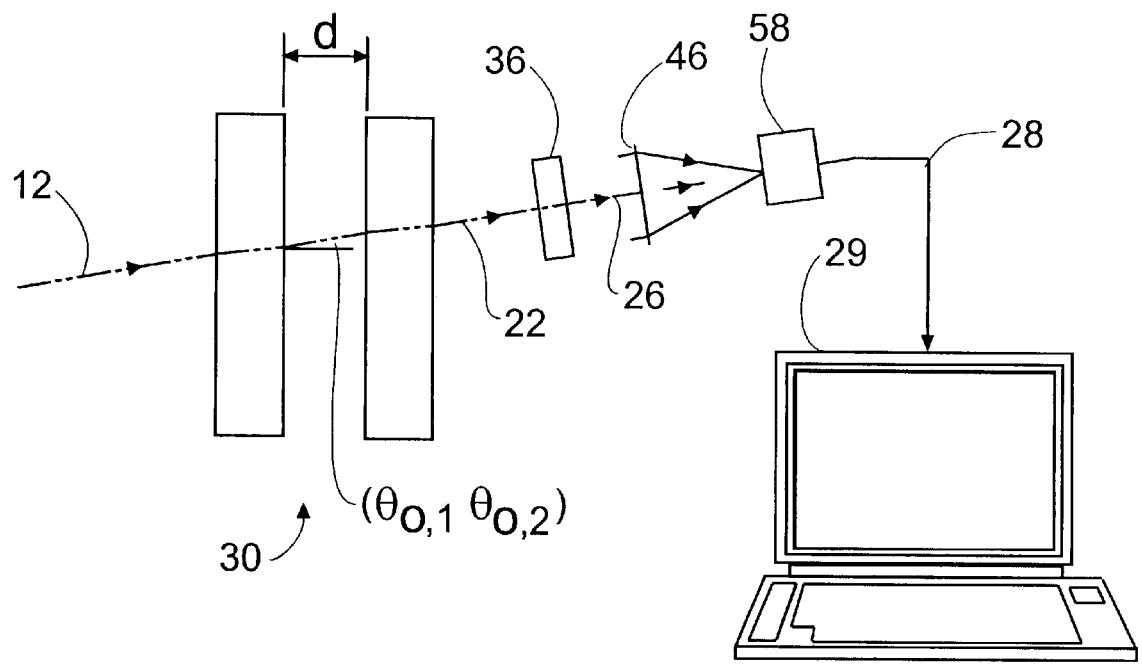
FIG. 1a is a diagrammatic elevational view, with parts in perspective, of a first embodiment of the invention that measures changes in the angle between the directions of propagation of two beam components in one plane.

The first embodiment of the present invention is shown schematically in FIG. 1a. Input beam 12 comprises two orthogonally polarized components having a difference in frequencies of $f_1$. The planes of polarization of the two orthogonally polarized components are at angles of 45° to the plane of FIG. 1a. The directions of propagation of the two components of input beam 12 may be the same or different one from the other and, therefore, such beam components, and those similar to them appearing hereinafter, can themselves be considered as individual light beams even though they propagate nominally co-extensively. Input beam 12 impinges on an etalon generally indicated by element number 30 with a gap d. The angles of incidence of the first and second components of input beam 12 at the interior faces of etalon 30 are $\theta_{o,1}$ and $\theta_{o,2}$, respectively. Angles $\theta_{o,1}$ and $\theta_{o,2}$ are selected so that the transmission of the first and second components of input beam 12 by etalon 30 are each substantially at a maximum excluding the maximum in transmission possible at $\theta_{o,j}=0$ for j=1,2. For the first embodiment, the difference angle $(\theta_{o,2}-\theta_{o,1})<<$ than the angular width of the corresponding transmission peak.

The first and second components of input 12 are transmitted as first and second orthogonally polarized beam components of output beam 22. Output beam 22 is transmitted by polarizer 36 to form mixed beam 26. Mixed beam 26 is focused by lens 46 to an image spot on detector 58. The beam forming the image spot is detected, preferably by photoelectric detection, by detector 58 as electrical interference signal 28.

Signal 28 is a heterodyne signal, having a heterodyne frequency equal to $f_1$, the difference in frequencies of the first and second components of input beam 12, and a heterodyne phase $\phi_{1,2}$. Signal 28 may be processed by a suitably programmed general purpose computer such as that designated generally at 29 or by customized electronic processors or their equivalent.

For a non-limiting example of a non-apodized square aperture at lens 46, the intensity profile $I_{h,1}$, at the image spot in the plane of FIG. 1a for components of beam 26 responsible for heterodyne signal 28, is written to a good approximation as $$I_{h,1} = \frac{C_{h,1}(1-R_1)^2}{[(1-R_1)^2 + 4R\sin^2(\delta'_{1,2}/2)]} \times \operatorname{sinc}^2[kp_{1,2}(b/2)]\cos[\omega_1 t + (\phi_2 - \phi_1)] \quad (1)$$

where $$\delta'_j = 2knd\ (p_j\tan\theta_{o,j} + \cos\theta_{o,j}),\ j=1,2, \quad (2)$$

$$p_j = \sin\theta_{o,j} + \sin\theta_{i,j},\ j=1,2, \quad (3)$$

$$\tan\phi_j = \frac{R_1\sin\delta_j}{1 - R_1\cos\delta_j},\ j=1,2, \quad (4)$$

Figure 1B:
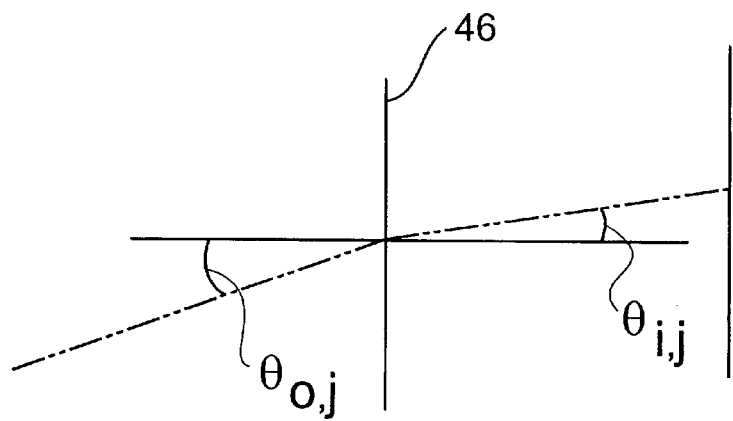
FIG. 1b shows the relationship between angles $\theta_{o,1}$ and $\theta_{o,2}$ that are useful in understanding the operation of the invention.

$\delta'_{1,2}=(\delta'_2+\delta'_1)/2$, $p_{1,2}=(p_2+p_1)/2$, b is the width of the square aperture at lens 46 in the plane of FIG. 1a, $C_{h,1}$ is a proportionality constant, $R_1$ is the intensity reflectivity of the interior surfaces of etalon 30, $\omega_1=2\pi f_1$, and k and n are, respectively, the wavenumber of the input beam components and the index of refraction of a medium in the gap of etalon 30. Angles $\theta_{o,1}$ and $\theta_{o,2}$ are defined in FIG. 1b.

Heterodyne signal 28 is proportional to the integral of $I_{h,1}$ over the image spot. At a transmission peak, i.e. $\delta'_j \equiv 2q_j\pi$ where $q_j$ is an integer typically >>1 and $\phi_j \equiv 2q'_j\pi$ where $q'_j$ is an integer, sensitivity of heterodyne phase $\phi_{1,2}$ to changes in $\theta_{o,1}$ and $\theta_{o,2}$ may be expressed as $$d\varphi_{1,2} = -\frac{R_1}{(1-R_1)}2knd\left[\sin\left(\frac{\theta_{o,2}+\theta_{o,1}}{2}\right)\right](d\theta_{o,2}-d\theta_{o,1}). \quad (5)$$

In order to reduce complexity in the display of general properties of the invention without departing from the scope or spirit of the invention, higher order terms in Eq. (5) have been omitted.

Heterodyne phase, $\phi_{1,2}=\phi_2-\phi_1$, may be obtained through the use of time based phase analysis procedures such as with a Hilbert transform or the like.

For an etalon spacing of d=4 mm, $R_1$=0.99, $\lambda$=633 nm, n=1.000, and $[(\theta_{o,2}+\theta_{o,1})/2]$=0.0129 rad, sensitivity of phase $\phi_{1,2}$ to changes in $\theta_{o,1}$ and $\theta_{o,2}$ is.

$$d\phi_{1,2} = -1.01\times10^5(d\theta_{o,2}-d\theta_{o,1}). \quad (6)$$

Or expressed in terms of sensitivity of inferred values for $(d\theta_{o,2}-d\theta_{o,1})$ from measured changes in phase $\phi_{1,2}$, $$(d\theta_{o,2}-d\theta_{o,1}) = -0.99\times10^{-5}d\phi_{1,2}. \quad (7)$$

It is evident for the first embodiment that the measurement of a difference in angle $(d\theta_{o,2}-d\theta_{o,1})$ is based on an optical differencing technique wherein the measured phase difference between a first and second beam component is not sensitive in first order to effects of a frequency shift common to both the first and second beam components.

Improved accuracy in measurements of relative changes in directions of propagation of input beam components can be obtained by operating at a low frequency split between the first and second beam components. The option to use a low frequency split in certain end use applications is a direct consequence of the absence of first order input beam frequency shift effects in the phase of heterodyne signal 28 used to measure and monitor changes in relative directions of propagation of components of input beam 12.

The phase of the electrical interference signal used to measure and monitor changes in direction of propagation of the input beam may be determined using either a heterodyne technique as described or a homodyne technique when frequency $f_1 \equiv 0$.

The first embodiment can be used as a null detector without accurate knowledge of the coefficient of $d\phi_{1,2}$ in Eq. (7). With the calibration of the coefficient of $d\phi_{1,2}$ in Eq. (7), the first embodiment can be used to measure relative changes in the direction of propagation of the first and second components of input beam 12 that are less than the width of the corresponding transmission peak. For end use applications where there are relative changes in the direction of propagation of the first and second components of input beam 12 that are of the order of or greater than the width of a corresponding transmission peak, subsequently described third embodiment is a preferred embodiment.

Figure 2:
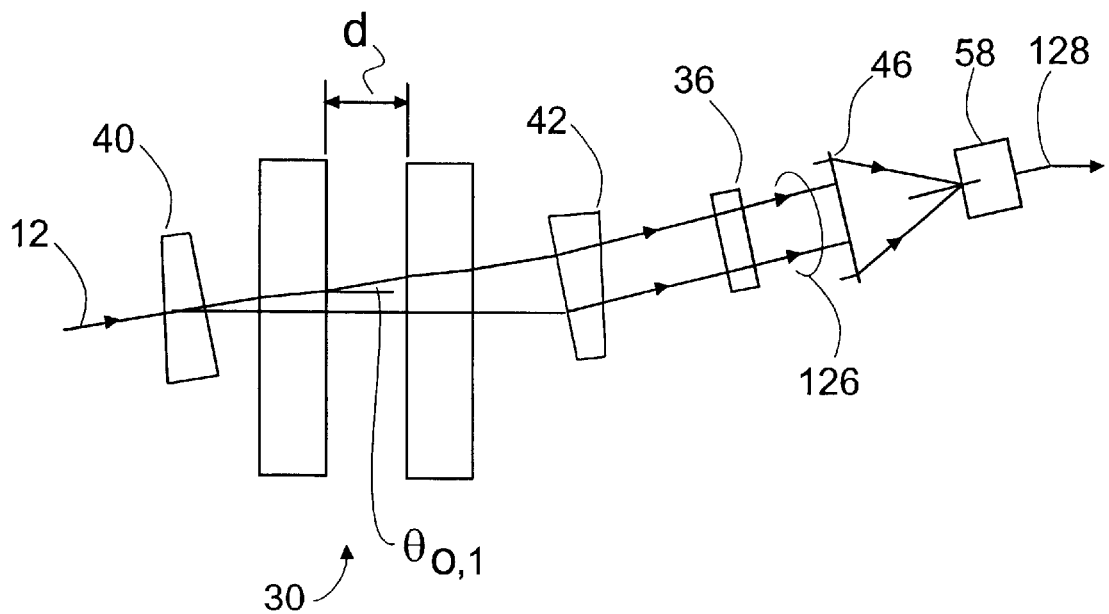
FIG. 2 is a diagrammatic elevational view of a second embodiment of the invention that measures changes in the direction of propagation of a beam component in one plane relative to a direction fixed by the apparatus of the second embodiment.

The second embodiment is shown schematically in FIG. 2. Apparatus of the second embodiment comprises the same components as the apparatus of the first embodiment and two birefringent prisms 40 and 42. Birefringent prism 40 introduces an angle between the first and second components of input beam 12 such that $\theta_{o,1}$ and $\theta_{o,2}$ correspond to two different transmission peaks of etalon 30. Birefringent prism 42 recombines beams out of etalon 30 so that first and second components of the output beam 126 associated with the first and second components of input beam 12, respectively, have substantially parallel directions of propagation. For example, if $\theta_{o,2}=0$ for the second embodiment, then the sensitivity of phase $\phi_{1,2}$ to changes in $\theta_{o,1}$ is expressed by Eqs. (5) and (6) with $d\theta_{o,2}=0$. Likewise, sensitivity of inferred values for $d\theta_{o,1}$ from measured changes in phase $\phi_{1,2}$ is expressed by Eq. (7) with $d\theta_{o,2}=0$.

Thus, with the calibration of the coefficient of in Eq. 7, the second embodiment can be used to measure changes in the direction of propagation of the first component of the input beam 12 with respect to an orientation of the apparatus of the second embodiment. It will be evident to those skilled in the art that the second embodiment can equally well be been configured to measure changes in the direction of propagation of the second component of input beam 12 without departing from the scope or spirit of the present invention.

The remaining description of the second embodiment is the same as corresponding portions of the description given for the first embodiment.

Figure 3A:
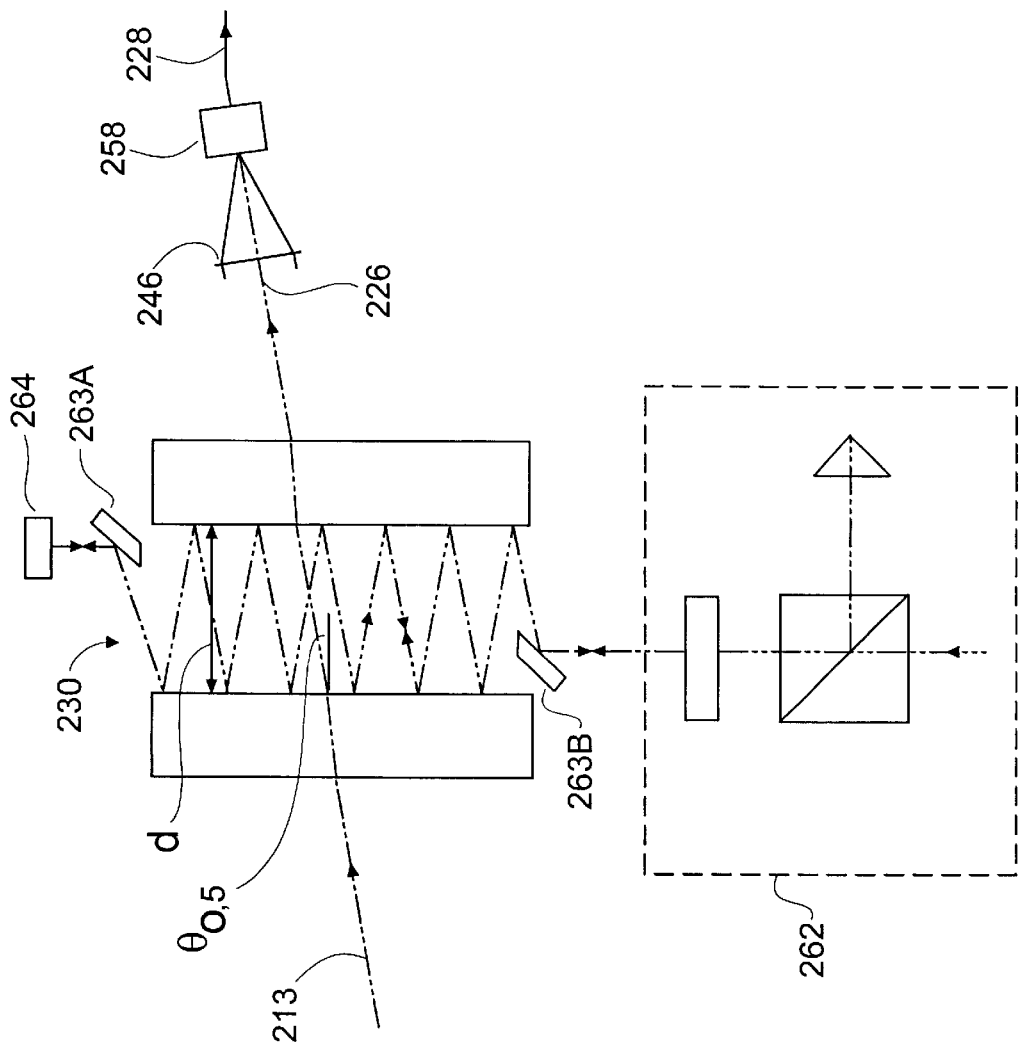
FIG. 3a is a diagrammatic elevational view of a third embodiment of the invention that measures changes in the direction of propagation of a beam in one plane relative to a direction fixed by the apparatus of the third embodiment.

The third embodiment is shown schematically in FIG. 3a. The third embodiment measures changes in the direction of propagation of a beam in one plane relative to a direction fixed by the apparatus of the third embodiment. In the third embodiment, a change in the direction of the beam is first converted to information contained in a change in an optical path length and then the information contained in the change in the optical path length is measured interferometrically. The measured change in the optical path is subsequently used to determine the corresponding change in the direction of the beam.

The apparatus of the third embodiment shown in FIG. 3a comprises many components that are the same as components of the first embodiment. Elements of the third embodiment performing the same functions as elements of the first embodiment have element numbers that are the same as element numbers of corresponding elements of the first embodiment incremented by 200. Input beam 213 is a single frequency optical beam. Apparatus of the third embodiment further comprises a differential plane mirror interferometer 262 with measurement object formed by mirrors 263A, 263B, and 264 and the reflecting surfaces of etalon 230.

The intensity profile, at the image spot in the plane of FIG. 3a for the beam responsible for signal $S_5$ indicated as element 228 in FIG. 3a, is written to a good approximation as $$I_{h,5} = \frac{C_5(1-R_5)^2}{[(1-R_5)^2 + 4R_5\sin^2(\delta_5'/2)]}\text{sinc}^2[kp_5(b/2)] \quad (8)$$

where $$\delta_5' = 2knd(p_5 \tan\theta_{o,5} + \cos\theta_{o,5}), \quad (9)$$

$$p_5 = \sin\theta_{o,5} + \sin\theta_{i,5}, \quad (10)$$

$C_5$ is a proportionality constant, and $R_5$ is the intensity reflectivity for the reflecting surfaces of etalon 230.

For a high finesse etalon system, $I_{h,5}$ given by Eq. (8) reduces to $$I_{h,5} = C_5 \text{sinc}^2[kp_5(b/2)] \quad (11)$$

with $\delta_5' = 2q_5\pi$ where $q_5$ is an integer. $I_{h,5}$ expressed by Eq. (11) may be written in a Taylor series about a value $(p_5)_0$ of $p_5$ as $$I_{h,5} = C_5 \left\{ \begin{array}{l} \text{sinc}^2[k(p_5)_0(b/2)] - \\ \frac{1}{6}\text{sinc}[k(p_5)_0(b/2)](kb)^2(p_5)_0 \times \\ [p_5 - (p_5)_0] + \ldots \end{array} \right\}. \quad (12)$$

From Eq. (9), we obtain the relationship $$[p_5 - (p_5)_0] = -\frac{[(nd) - (nd)_0]\cos\theta_{o,5}}{(nd)_0\tan\theta_{o,5}}. \quad (13)$$

Higher order terms have been omitted in Eq. (13) for the purpose of displaying the important features of the invention without departing for the scope or spirit of the present invention.

In the operation of the third embodiment, the quantity (nd) is modulated at an angular frequency $\omega_5$ with an amplitude $\Delta(nd)$ or written as a formula $$(nd) = (nd)_0 + \Delta(nd)\cos\omega_5 t. \quad (14)$$

With the use in Eq. (12) expressions for $p_5$ and (nd) given by Eqs. (13) and (14), we obtain the equation for $I_{h,5}$ $$I_{h,5} = C_5 \left\{ \begin{array}{l} \text{sinc}^2\left[\frac{k(p_5)_0 b}{2}\right] - \\ \frac{1}{6}\text{sinc}\left[\frac{k(p_5)_0 b}{2}\right]\left(\frac{\cos\theta_{o,5}}{\tan\theta_{o,5}}\right)\left(\frac{\Delta(nd)}{nd}\right) \times \\ (kb)^2(p_5)_0 \cos\omega_5 t + \ldots \end{array} \right\}. \quad (15)$$

Figure 1C:
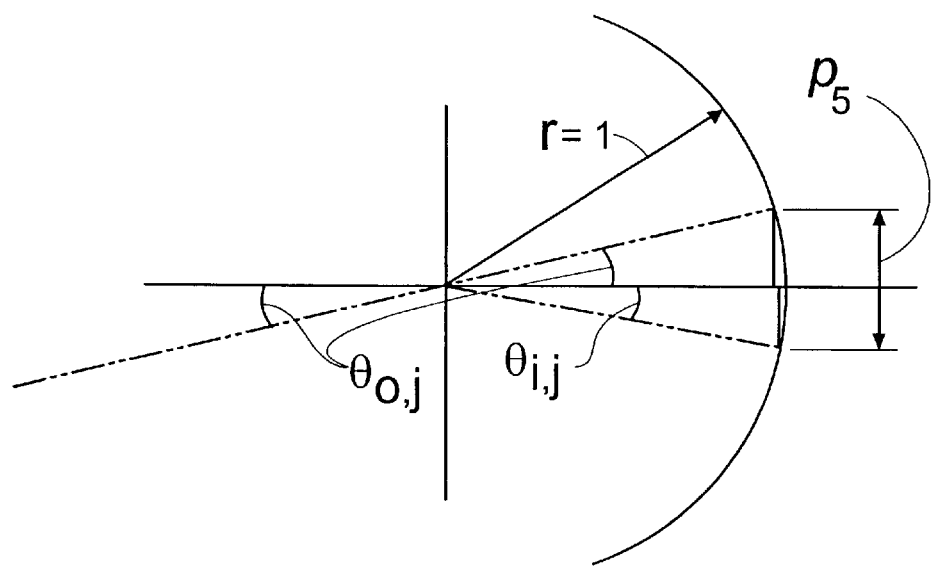
FIG. 1c is a diagrammatic representation that is useful in defining certain relationships employed in practicing the invention.

The amplitude of the Fourier component of $I_{h,5}$ at angular frequency $\omega_5$ is proportional to a non-zero value of $(p_5)_0$. In the third embodiment, measured values of the Fourier component can be used as the error signal in a servo control system to servo control $(p_5)_0$ such that $(p_5)_0 = 0$. It will be appreciated that if $(p_5)_0 = 0$, optical beam 213 is passing through a place in image space where there is a maximum for the transfer function of etalon 230 and is illustrated in FIG. 1c.

The control of $(p_5)_0$ in the third embodiment is by modifying the spacing d of etalon 230 by piezoelectric transducers (not shown in FIG. 3a). The signal to the piezoelectric transducers is derived from signal 228.

Note that the amplitude of the Fourier component exhibits a high sensitivity to an error or non-zero value in $(p_5)_0$ because of the presence of factor $(kb)^2/(6\tan\theta_{o,5})$. The value for the factor $(kb)^2/(6\tan\theta_{o,5})$ is $1.9\times10$ for b=4 mm, n=1.000, $\lambda$=633 nm, and $\theta_{o,5}$=0.014 rad. At an error in $(p_5)_0$ of $10^{-8}$ rad and a $[\Delta(nd)/(nd)]=10^{-5}$, the amplitude of the signal at $\omega_5$ relative to signal component with amplitude $C_5$ is 0.0019.

Figure 5:
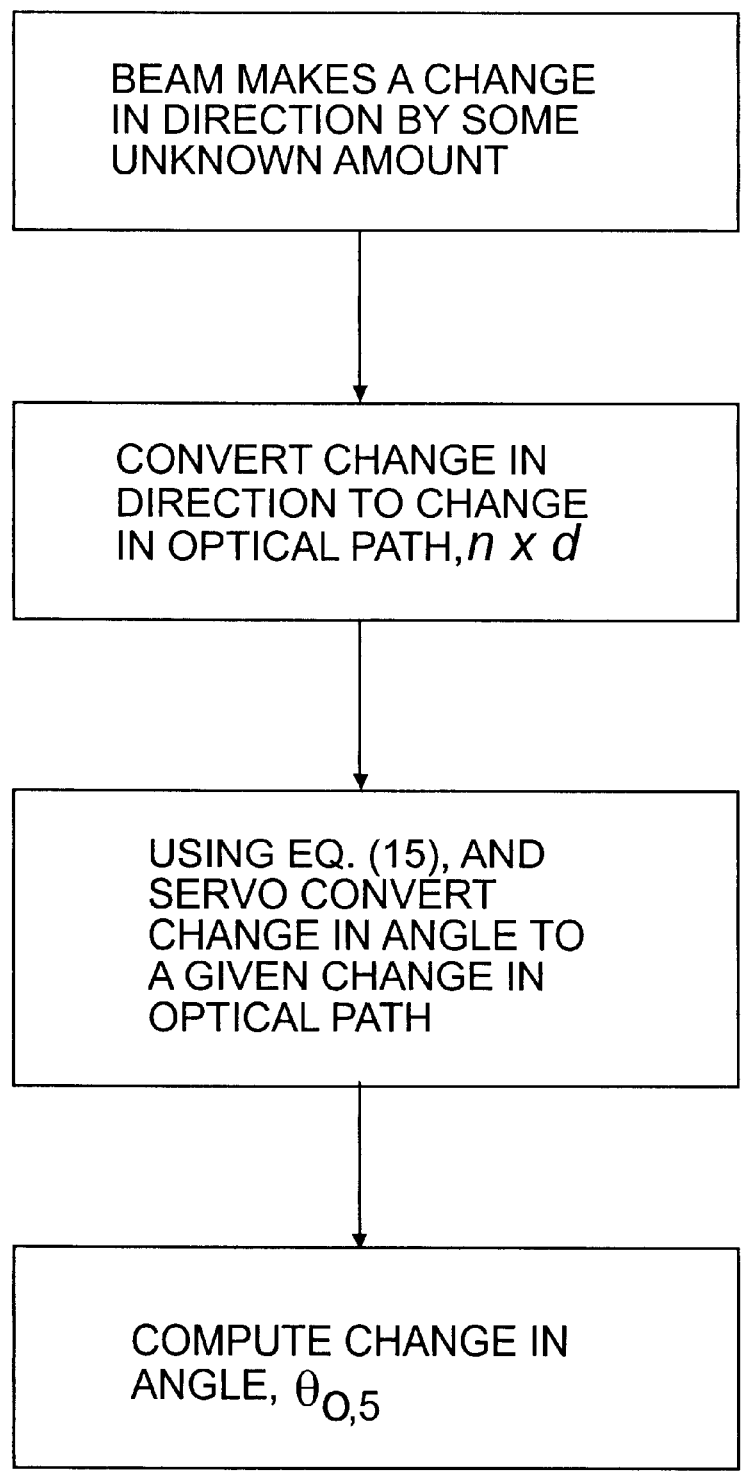
FIG. 5 is a flow chart indicating various steps that may be carried out to practice the fourth embodiment of the invention and variants thereof.

The control of $(p_5)_0$ so that $(p_5)_0=0$ converts a change in the direction of propagation of input beam 213 to information contained in a change in an optical path length. Next the information contained in the change in the optical path length (nd) is used to determine the corresponding change in the direction of propagation of input beam 213. The changes in optical path length (nd) are measured interferometrically in the third embodiment by the second interferometer, differential plane mirror interferometer 262. Changes in $\theta_{o,5}$ are then obtained from the measured changes in optical path length (nd) using Eq. (9) noting that $\delta_5'=2q_5\pi$ and $(p_5)_0=0$. The flow chart for this procedure is given in FIG. 5. The measurement beam of interferometer 262 is arranged to make multiple reflections at the high reflectivity surfaces of etalon 230 so as to increase sensitivity of the second interferometer 262 to changes in optical path length (nd).

For end use applications where beam 213 is a beam derived from a displacement measuring interferometer operating in a heterodyne mode, the source of the input beam for the second interferometer 262 is a portion of two frequency input beam to the displacement measuring interferometer so that the second interferometer 262 also operates in a heterodyne mode.

The remaining description of the third embodiment is the same as corresponding portions of the description given for the description of the first embodiment.

Figure 3B:
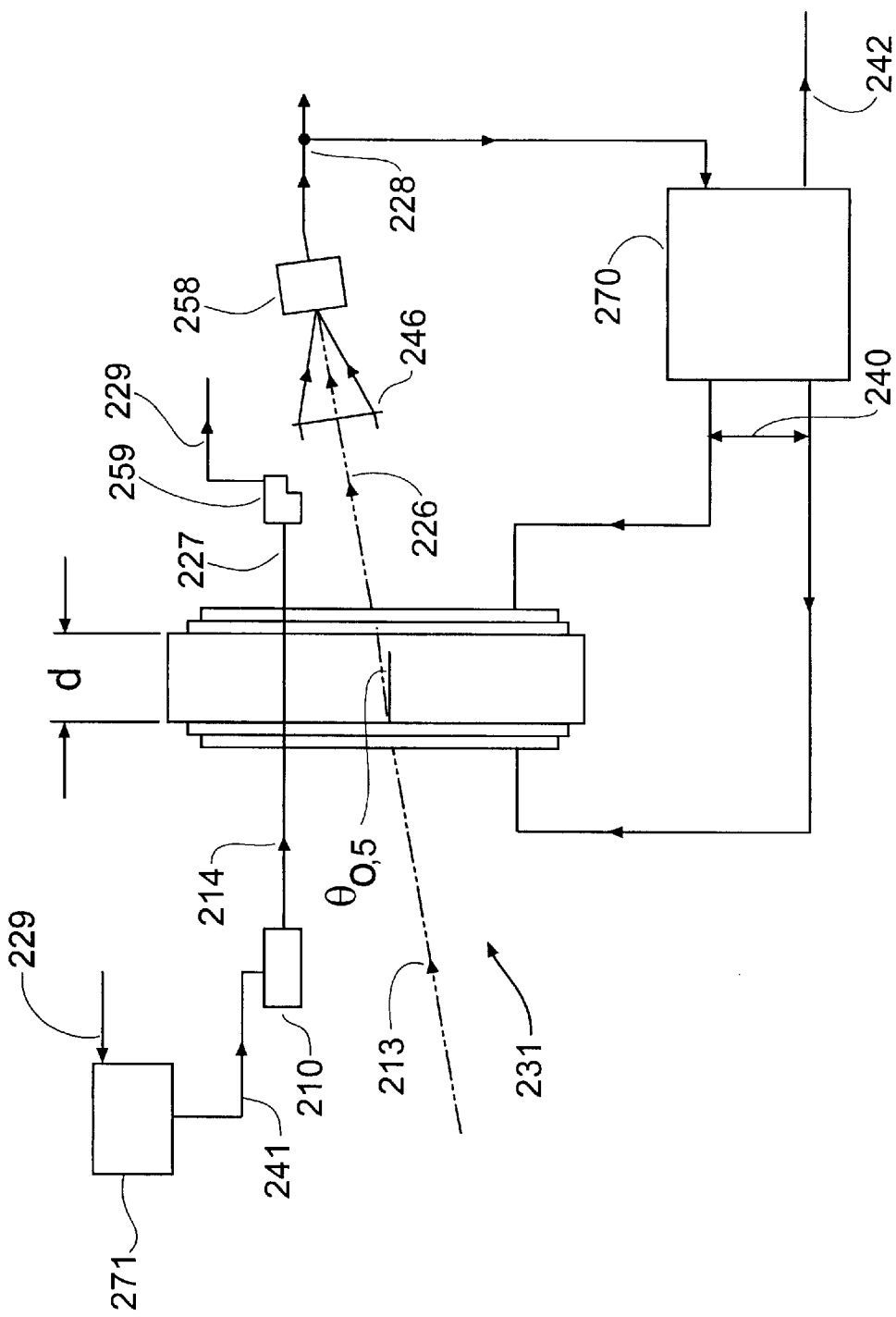
FIG. 3b is a diagrammatic elevational view of a variant of the third embodiment of the invention that measures changes in the direction of propagation of a beam in one plane relative to a direction fixed by the apparatus of the third embodiment.

A variant of the third embodiment is schematically in FIG. 3b. Apparatus of the variant of the third embodiment comprises elements of the apparatus of the third embodiment having the same element numbers and an etalon generally indicated as element 231 in FIG. 3b.

Etalon 231 comprises high finesse cavity surfaces with an electro-optic crystal as the medium. For the variant of the third embodiment, optical path length (nd) is controlled by applying an electric field to the electro-optic crystal. The electric field is created by electrical signal 240 applied to the transparent electrodes of etalon 231. A component of electric signal 240 is generated as a servo control signal by electronic processor 270 based on heterodyne signal 228. Electrical signal 240 also comprises a component modulated at angular frequency $\omega_5$. The servo signal component of electrical signal 240 controls the electric field so as to control $(p_5)_0$ such that $(p_5)_0=0$.

The control of $(p_5)_0$ such that $(p_5)_0=0$ converts a change in the direction of propagation of input beam 213 to information contained in a change in an optical path length (nd). For certain end use applications, changes in optical path length (nd) can be derived by electronic processor 270 directly from the servo control signal component of electrical signal 240 as output signal 242 and knowledge of the relationship between n and an applied electrical signal.

For certain other end use applications, changes in optical path length (nd) are measured by a second optical system comprising optical source 210, input beam 214, output beam 227, detector 259, electrical signal 229, electronic processor 271, and servo control signal 241. The direction of propagation of input beam 214 is orthogonal to the high reflectivity surfaces of etalon 231.

Source 210 comprises a source of a single frequency beam such as a single mode laser diode. The wavenumber $k_6$ of source 210 is modulated at an angular frequency $\omega_6$ by modulation of an injection current to the laser diode. The component of output beam 229 at angular frequency $\omega_6$ is used by electronic processor 271 to generate servo control signal 241. Servo control signal 241 is transmitted to source 210 to control the wavenumber $k_6$ such that $2k_6 nd = 2\pi q_6$ where $q_6$ is an integer. Under the condition $2k_6 nd = 2\pi q_6$, a change in the direction of propagation of input beam 213 has been converted to information contained in a change in wavenumber $k_6$.

Changes in $k_6$ are measured using known techniques. One known technique measures the beat frequency between a portion of beam 214 and a reference beam of fixed frequency. A second known technique measures interferometrically the change in an optical path of fixed physical length. For certain end use applications, knowledge of the relationship between the injection current to the diode laser and wavenumber $k_6$ may be used to monitor changes in $k_6$. Changes in $\theta_{o,5}$ are then obtained from the measured changes in wavenumber $k_6$ using Eq. (9) noting that $\delta'_5 = 2q_5\pi$, $(p_5)_0 = 0$, and $2k_6 nd = 2\pi q_6$.

The remaining description of the variant of the third embodiment is the same as corresponding portions of the description given for the third embodiment.

Figure 4:
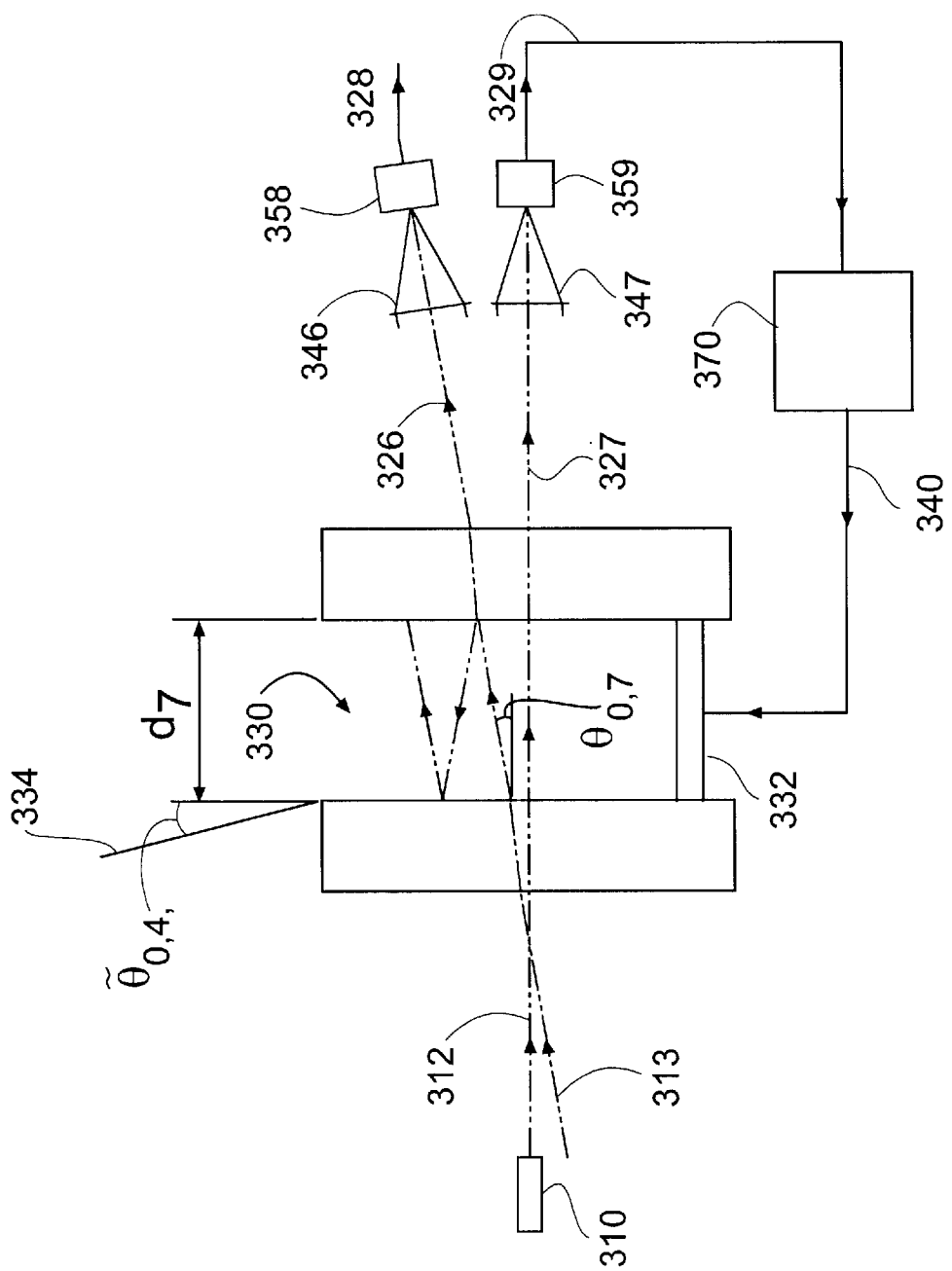
FIG. 4 is a diagrammatic elevational view of a fourth embodiment of the invention that determines interferometrically when an angle between the directions of propagation of two beams in a given plane is the same as a predetermined value according to an end use application and/or measures in a given plane the angle between the directions of propagation of two beams.

The fourth embodiment is shown schematically in FIG. 4. The fourth embodiment determines interferometrically the degree to which an angle between the directions of propagation of two beams in a given plane is the same as a predetermined value according to an end use application. The variant of the fourth embodiment measures interferometrically in a plane the angle between the directions of propagation of two beams.

The apparatus of the fourth embodiment shown in FIG. 4 comprises many components that are the same as components of the first embodiment. Except for properties of etalon 330, generally indicated in FIG. 4 as element 330, elements of the fourth embodiment performing the same functions as elements of the first embodiment have element numbers that are the same as element numbers of corresponding elements of the first embodiment incremented by 300.

Apparatus of the fourth embodiment comprises two interferometric systems. A first interferometric system produces an electrical signal 328 that indicates an error in the direction of propagation of input beam 313. Input beam 313 is a single frequency optical beam. The error is a change in the angle $\theta_7$ from a predetermined value $\theta_{0,7}$ wherein angle $\theta_7$ is the angle between the direction of propagation of input beam 313 in the plane of FIG. 4 relative to a normal to the two surfaces defining the cavity of etalon 330 (see FIG. 4). A second interferometric system generates control signal 340 for control of the spacing $d_7$ of etalon 330 to a predetermined value. Spacing $d_7$ is determined by transducer 332 comprising a set of piezoelectric transducers (one shown).

The first interferometric system generates an electrical signal $S_7$ indicated as element 328 in FIG. 4. Electrical signal $S_7$ has the same general properties of signal $S_5$ of the third embodiment given by Eq. (15) and may be written as $$s_7 = C_7 \left\{ \frac{1}{6}\mathrm{sinc}\left[\frac{k(p_7)_0 b}{2}\right]\left(\frac{\cos\theta_{o,7}}{\tan\theta_{o,7}}\right)\left(\frac{\Delta(nd)}{nd}\right) \times \atop (kb)^2(p_7)_0\cos\omega_7 t + \ldots \right\}. \quad (16)$$

The heterodyne component of $S_7$ has an angular frequency $\omega_7$.

The remaining description of the operation of the first interferometric system is the same as corresponding portions of the description given for the third embodiment.

A second interferometric system generates an electrical signal $S_8$ indicated as element 329 in FIG. 4. Electrical signal $S_8$ may be written as $$s_8 = C_8 \left\{ \mathrm{sinc}^2\left[\frac{k(p_8)_0 b}{2}\right] - \atop \frac{8R_7}{(1-R_7)^2}(kb\cos\theta_{o,8})^2\left(\frac{\Delta(nd)}{nd}\right)\Delta(nd)_0\cos\omega_7 t + \ldots \right\}. \quad (17)$$

The heterodyne component of $S_8$ has an angular frequency $\omega_7$. The heterodyne component of $S_8$ is used by electronic processor 370 to generate servo control signal 340 for the control of (nd) such that $$2k_7(nd)_7 = 2\pi q_7, \quad q_7 = 1, 2, \ldots \quad (18)$$

It should be evident that the foregoing arrangements are particularly suitable for use in high frequency applications. The remaining description of the fourth embodiment is the same as corresponding portions of the description given for the first and third embodiments.

It will be evident to those skilled in the art that the apparatus of the fourth embodiment may be used to measure the angle between two lines with the resolution of the phase redundancy represented by $q_7$ and $q_8$. The phase redundancy can be resolved by known techniques. The two lines may comprise normals to one or more surfaces and/or directions of propagation optical beams.

Figure 6A:
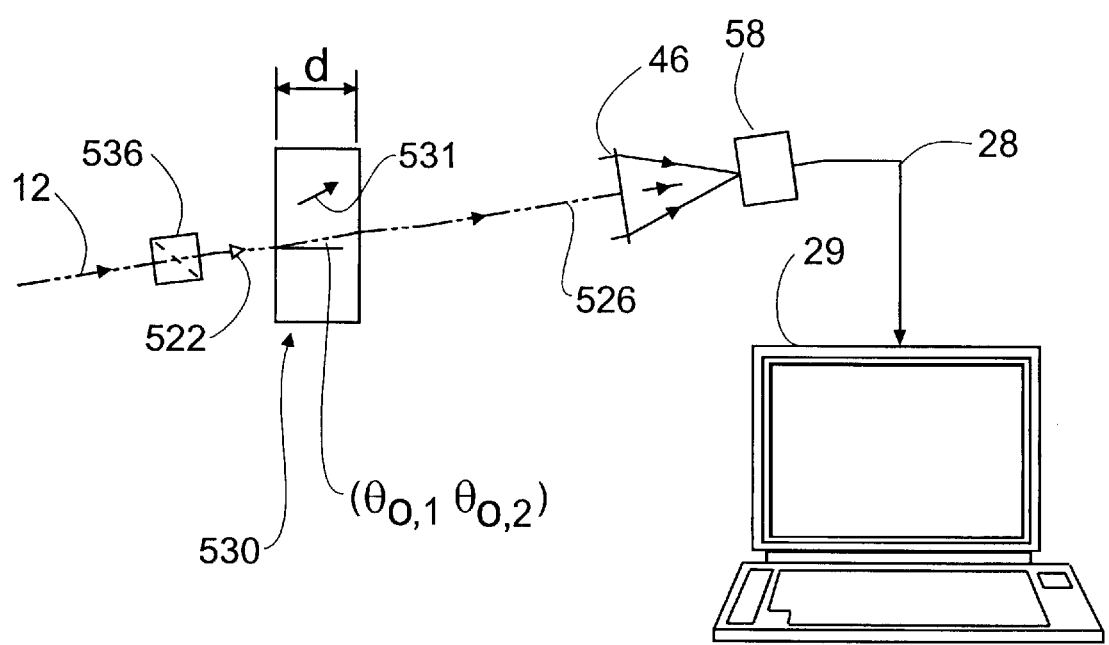
FIG. 6a is a diagrammatic elevational view of a fifth embodiment of the invention that measures changes in the angle between the directions of propagation of two beam components in one plane.

The fifth embodiment is shown schematically in FIG. 6a. The fifth embodiment measures changes in the angle between the directions of propagation of two beam components in one plane wherein the measured change in the angle is compensated for effects of changes in temperature of the apparatus of the fifth embodiment. Apparatus of the fifth embodiment comprises certain of the components as the apparatus of the first embodiment with the certain of the components of the fifth embodiment having the same element number as the corresponding component of the first embodiment. The fifth embodiment further comprises etalon 530 and polarizer 536.

The description of input beam 12 is the same as the description of input beam 12 of the first embodiment. Input beam 12 is incident on polarizer 536, e.g. a polarizing beam splitter, orientated to produce a mixed beam 522 plane polarized in the plane of FIG. 6a. Beam 522 is transmitted by etalon 530 and output beam 526.

Etalon 530 is a solid etalon of thickness d and comprised of a birefringent medium. The birefringent medium is selected such that it's respective temperature coefficients for thermal expansion and for change in indices of refraction have opposite signs such as ammonium dihydrogen phosphate (ADP). Optic axis 531 of the birefringent medium is shown in FIG. 6a with both components of the optical beam in etalon 530 having extraordinary polarization. The birefringent medium is further selected such that there is an orientation of optic axis 531 wherein the relative phase of the two components of output beam 526 is compensated for changes in temperature of etalon 530. ADP for example meets both of these conditions. The selection of the orientation of optic axis 531 takes into consideration the anisotropy of both the thermal expansion and of the indices of refraction of the birefringent medium.

The compensation for the effects of changes in temperature of etalon 530 is achieved when the quantity $$\frac{\partial (nd\cos\theta_{o,j})}{\partial T} = 0 \quad (19)$$

where T is the temperature of etalon 530. Eq. (19) may be expanded as $$\frac{\partial \ln n}{\partial T} + \frac{\partial \ln d}{\partial T} + \frac{\partial \ln \cos\theta_{o,j}}{\partial T} = 0 \quad (20)$$

where $[(\partial \ln x)/\partial T]=(1/x)(\partial x/\partial T)$ For an example of a birefringent medium comprising a uniaxial crystal, we have $$\frac{\partial \ln n}{\partial T} = \frac{\partial \ln n_o}{\partial T} + \frac{n_o^2 \sin^2\theta}{n_o^2 + (n_e^2 - n_o^2)\cos^2\theta}\left(\frac{\partial \ln n_e}{\partial T} - \frac{\partial \ln n_o}{\partial T}\right) \quad (21)$$

where n is the index of refraction for an extraordinary polarized beam propagating at an angle θ with respect to optic axis 531 and $n_o$ and $n_e$ are the indices of refraction of ordinary and extraordinary polarized beams, respectively, propagating orthogonally to the optic axis.

The corresponding expression for ∂ln d/∂T may be written, for the example of a uniaxial crystal, as $$\frac{\partial \ln d}{\partial T} = \cos^2\theta \partial \ln \frac{z}{\partial T} + \sin^2\theta \frac{\partial \ln x}{\partial T} \quad (22)$$

where z and x are dimensions parallel to and orthogonal to the optic axis.

The remaining description of the fifth embodiment is the same as corresponding portions of the description given for the first embodiment.

Figure 6B:
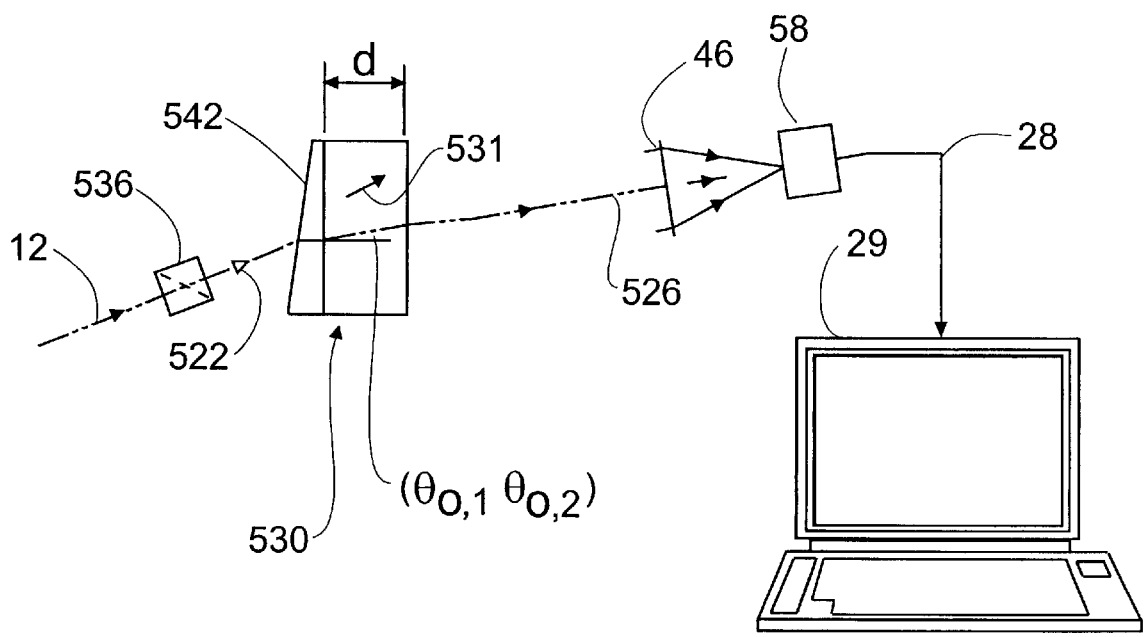
FIG. 6b is a diagrammatic elevational view of a first variant of the fifth embodiment of the invention that measures changes in the angle between the directions of propagation of two beam components in one plane.

The first variant of fifth embodiment is shown schematically in FIG. 6b. The first variant of the fifth embodiment measures changes in the angle between the directions of propagation of two beam components in one plane wherein the measured change in the angle is compensated for effects of changes in temperature of the apparatus of the fifth embodiment. Apparatus of the first variant of the fifth embodiment comprises the same components of the fifth embodiment and prism 542.

In the first variant of the fifth embodiment, a portion of the effects of changes of temperature of etalon 530 are compensated by the technique used in the fifth embodiment and the remaining portion of the effects of changes of temperature of etalon 530 are compensated by the effects of changes in temperature of prism 542. The effect of prism 542 is to alter the angle $\theta_{o,j}$ in etalon 530 as the temperature of prism 542 and etalon 530 change and thus effect the (∂ln $\cos\theta_{o,j}$/ ∂T) term in Eq. 20. Prism 542 may comprise a birefringent or a non-birefringent medium.

The remaining description of the first variant of the fifth embodiment is the same as corresponding portions of the description given for the fifth embodiment of the present invention.

Figure 6C:
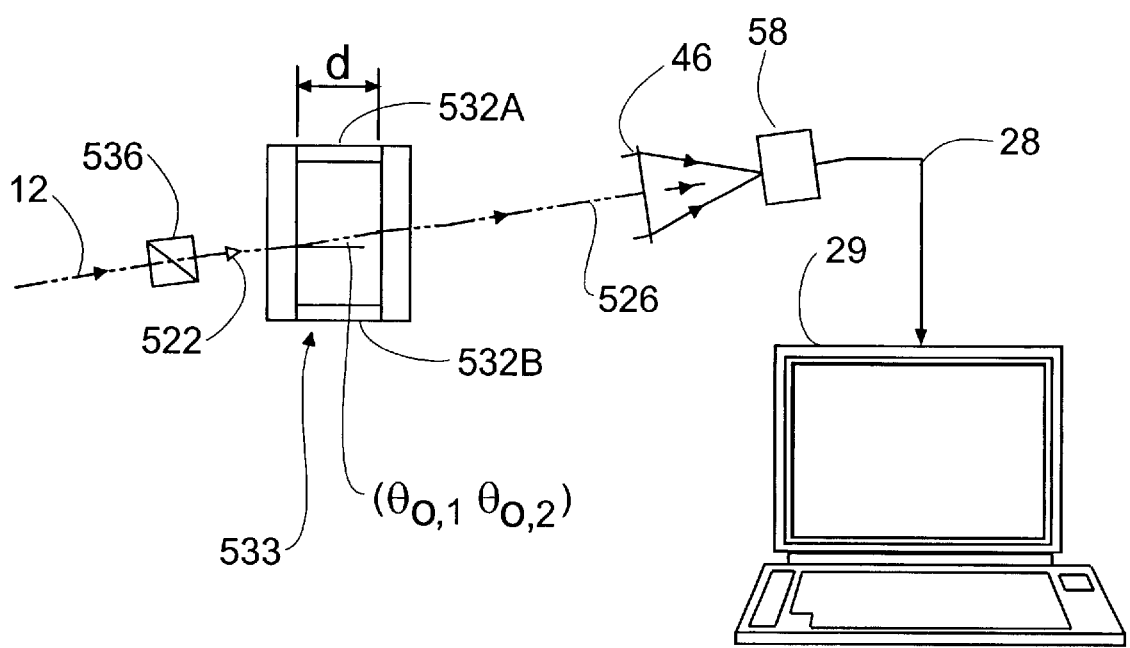
FIG. 6c is a diagrammatic elevational view of a second variant of the fifth embodiment of the invention that measures changes in the angle between the directions of propagation of two beam components in one plane.

The second variant of fifth embodiment of the present invention is shown schematically in FIG. 6c. The second variant of the fifth embodiment measures changes in the angle between the directions of propagation of two beam components in one plane wherein the measured change in the angle is compensated for effects of changes in temperature of the apparatus of the second variant of the fifth embodiment. Apparatus of the second variant of the fifth embodiment comprises the same components of the fifth embodiment except for etalon 533.

Etalon 533 is an air spaced etalon with the spacing of the corresponding etalon plates compensated for the effects of changes of temperature of spacers 532. Spacers 532A and 532B are designed to have substantially zero temperature coefficient for thermal expansion using techniques well known to someone skilled in the art.

The remaining description of the second variant of the fifth embodiment is the same as corresponding portions of the descriptions given for the fifth embodiment and first variant thereof.

Figure 7A:
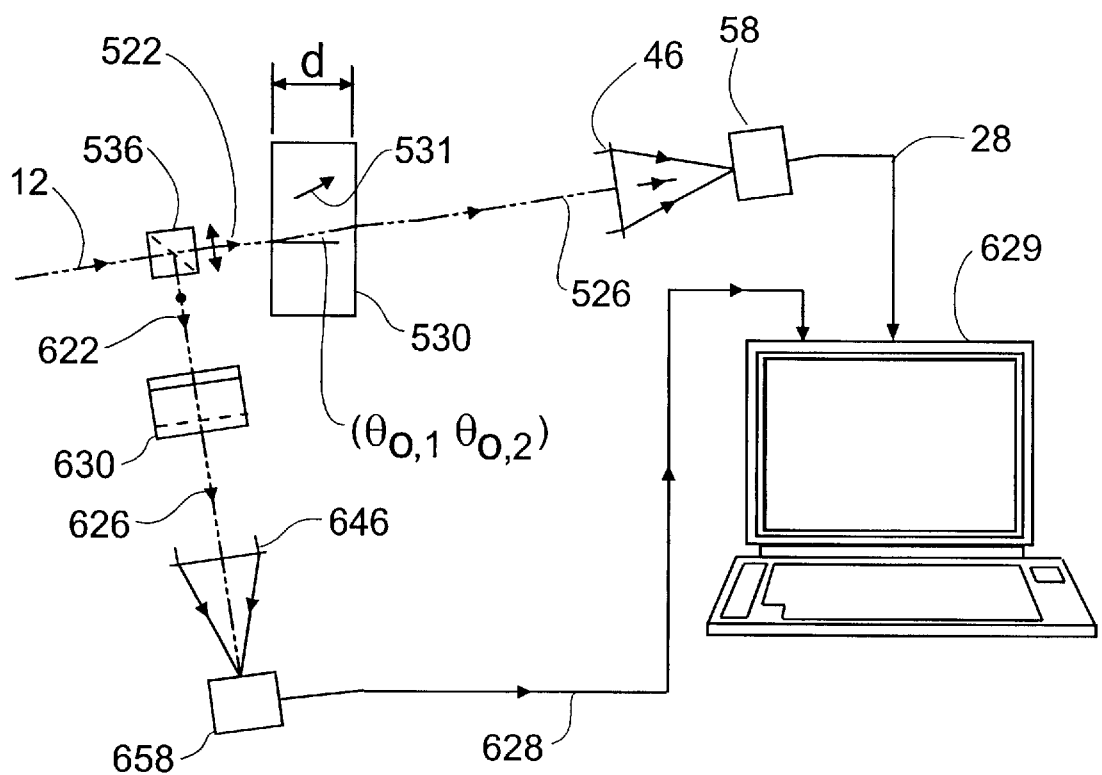
FIG. 7a is a diagrammatic elevational view of a sixth embodiment of the invention that measures changes in the angle between the directions of propagation of two beam components in two orthogonal planes.

The sixth embodiment is shown schematically in FIG. 7a. The sixth embodiment measures changes in the angle between the directions of propagation of two beam components in two orthognal planes. Apparatus of the sixth embodiment comprises two differential angle displacement interferometers for measuring changes in the relative direction of propagation of two beam components in the two orthogonal planes.

The description of a first of the two differential angle displacement interferometers is the same as the corresponding description given for the differential angle displacement interferometer of the fifth embodiment. The components of the first differential angle displacement interferometer are the same as the components of the fifth embodiment.

The second of the two differential angle displacement interferometers comprises polarizing beam splitter 536, etalon 630, lens 646, and detector 658. The component of input beam 12 polarized orthogonal to the plane of FIG. 7a is reflected by polarizing beam splitter 536 as beam 622. Description of beam 622 is the same as the description given beam 522 except for the respective directions of propagation and the respective planes of polarization.

Beam 622 is incident on etalon 630 with the plane of incidence orthogonal to the plane of FIG. 7a. The optic axis of etalon 630 is in the plane of incidence. The description of etalon 630 and the relationship of beam 622 to etalon 630 in its respective plane of incidence is the same as the corresponding portion of the description given for etalon 530 and the relationship of beam 522 to etalon 530 in its respective plane of incidence.

Beam 622 exits etalon 630 as beam 626. Beam 626 is focused by lens 646 onto detector 658 generating electrical interference signal 628. The descriptions of beam 626, lens 646, detector 658, and signal 628 are the same as corresponding portions of the descriptions given for beam 526, lens 546, detector 558, and signal 528 of the fifth embodiment. Signals 28 and 628 are processed by electronic processor 629 for the respective relative angular displacements in two orthogonal planes. The description of electronic processor 629 for signals 28 and 628 is the same as the corresponding portion of the description given for the detector 28 of the fifth embodiment.

The remaining description of the sixth embodiment is the same as corresponding portions of the description given for the fifth embodiment.

Figure 7B:
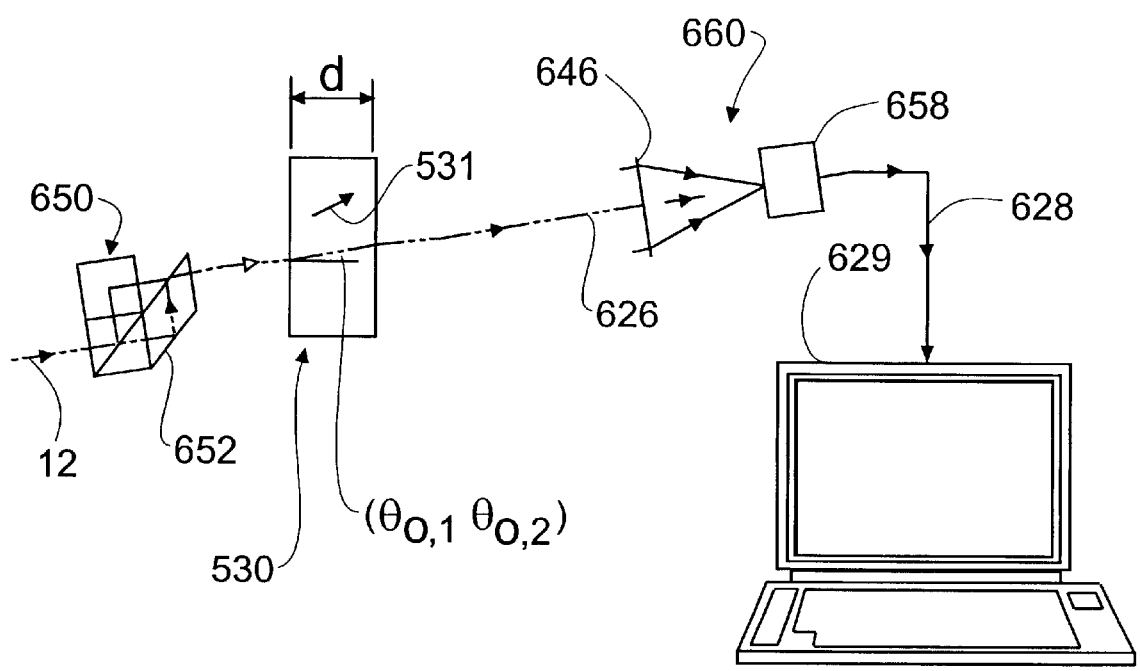
FIG. 7b is a diagrammatic elevational view of a variant of the sixth embodiment of the invention that measures changes in the angle between the directions of propagation of two beam components in two orthogonal planes.
Figure 7C:
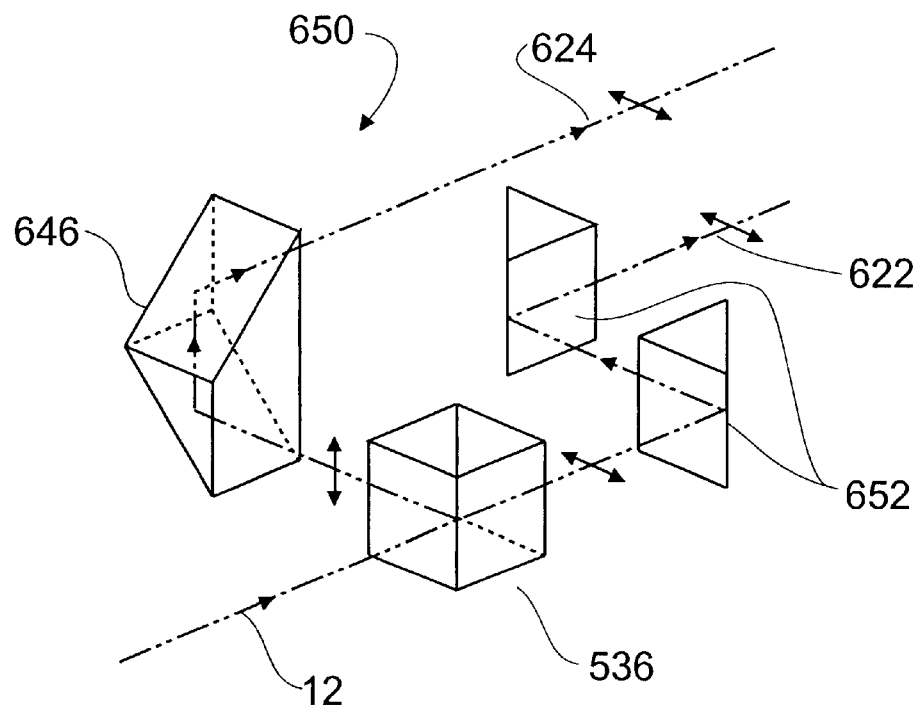
FIG. 7c is a diagrammatic top view, with parts in perspective, of a beam splitter assembly of the variant of the sixth embodiment.
Figure 7D:
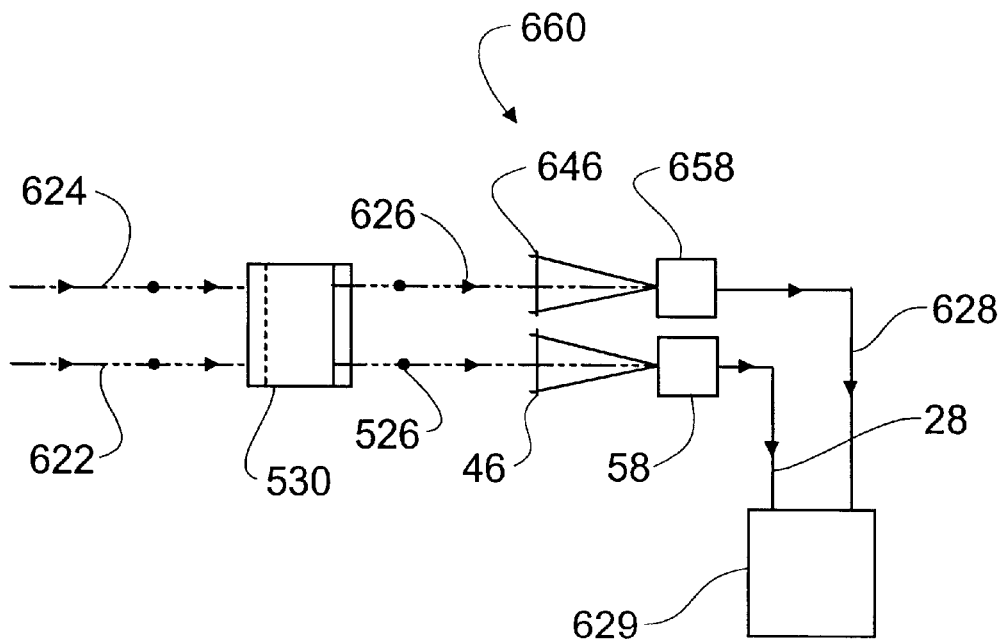
FIG. 7d is a diagrammatic bottom view of the detector portion of the variant of the sixth embodiment.

A variant of the sixth embodiment is shown schematically in FIGS. 7b–7d. The variant of the sixth embodiment measures changes in the angle between the directions of propagation of two beam components in two orthognal planes. Apparatus of the variant of the sixth embodiment comprises two differential angle displacement interferometers for measuring changes in the relative direction of propagation of two beam components in the two orthogonal planes.

The variant of the sixth embodiment is functionally the same as the sixth embodiment except for the generation of beams 622 and 624 (see FIGS. 7c and 7d) and except for the use of the same etalon, etalon 530, by beams 622 and 624. Beam 622 is transmitted by etalon 530 as beam 526. Beam 624 is transmitted by etalon 530 as beam 626. Paths of beams 526 and 626 are superimposed in FIG. 7b. The description of the detection and processing of signals 28 and 628 by electronic processor 629 of the variant of the sixth embodiment is the same as the corresponding portions of the description given for the detection and processing of signals 28 and 628 by electronic processor 629 of the sixth embodiment.

Input beam 12 is incident on beam splitter assembly generally shown at 650 and transmitted as beams 622 and 624. Paths of beams 622 and 624 are superimposed in FIG. 7b and shown separated in FIGS. 7c and 7d. Beam splitter assembly 650 comprises polarizing beam splitter 536, prism 646, and rhomboid 652 (see FIG. 7c). Rhomboid 652 which is shown as separated into two right angle prisms translates the components of beam 12 transmitted by polarizing beam splitter 536. Rhomboid 652 does not rotate the plane of polarization of an input beam so that the polarization of beam 622 is the same as the polarization of the beam transmitted by polarizing beam splitter 530. In addition, a change in direction of propagation of beam 622 resulting from a change in direction of propagation of the corresponding components of beam 12 are equal.

However, prism 646 deviates the direction of propagation of an input beam by 90° and rotates the plane of polarization of the input beam by 90°. As a consequence, the polarization of the input beam which is orthogonal to the plane of FIG. 7b is rotated by 90° such the polarization of output beam 624 in parallel to the plane of FIG. 7b. Also an angular displacement of the components of input beam 12 polarized orthogonal to the plane of FIG. 7b results in an angular displacement of associated beam 626 parallel to the plane of FIG. 7b.

Thus, electronic interference signals 28 and 628 contain information about angular displacements of beam 12 parallel to the plane and orthogonal to the plane of FIG. 7b.

The remaining description of the variant of the sixth embodiment is the same as corresponding portions of the description given for the sixth embodiment.

Figure 8A:
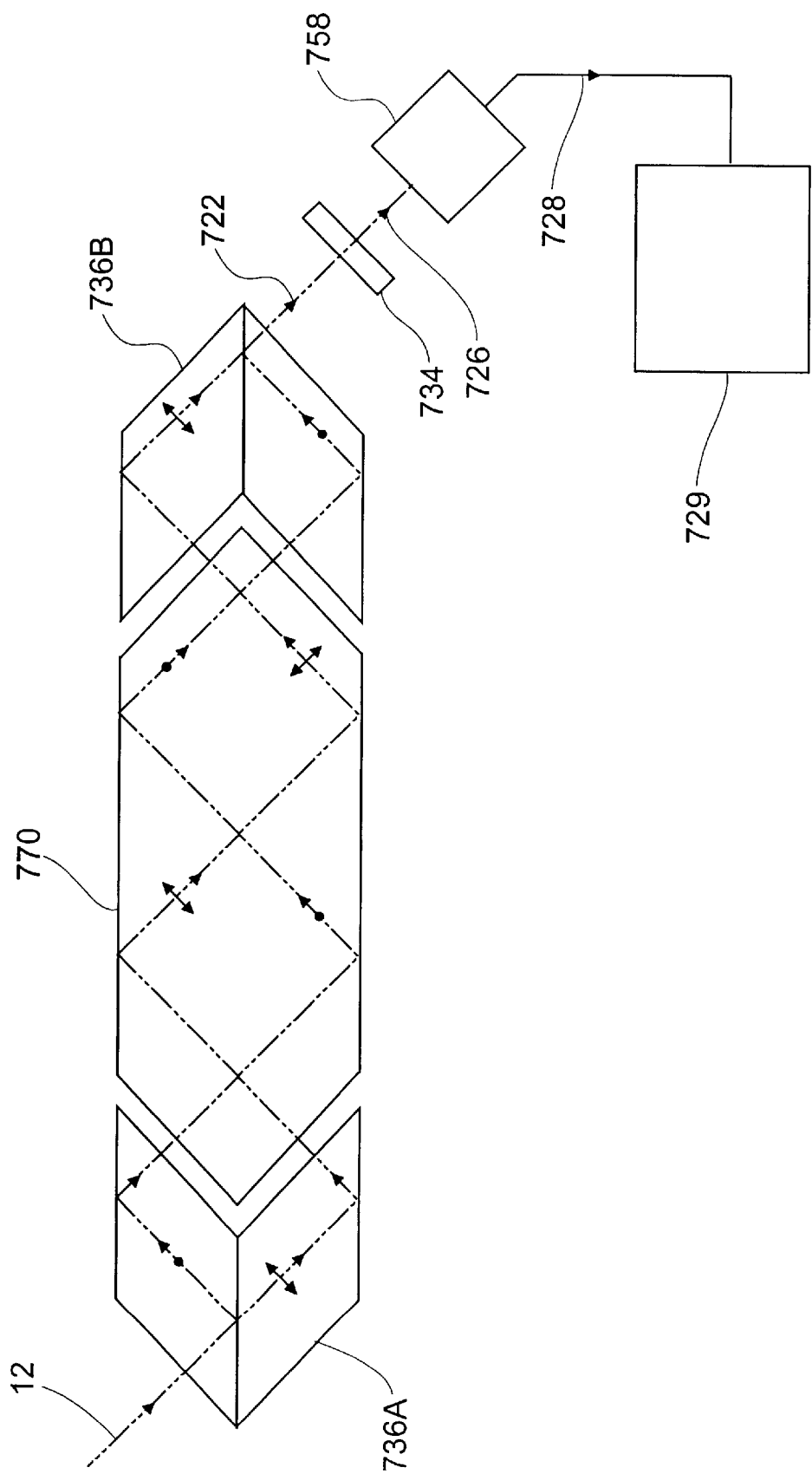
FIG. 8a is a diagrammatic elevational view of a seventh embodiment of the invention that measures changes in the orientation of an object in one plane.

The seventh embodiment is shown schematically in FIG. 8a. The seventh embodiment measures changes in the orientation of object 770 in the plane of FIG. 8a. Input beam 12 is incident on polarizing beam splitter 736A. The description of input beam 12 is the same as the description given for input beam 12 of the first embodiment.

The component of input beam 12 transmitted by polarizing beam splitter 736A and polarized parallel to plane of FIG. 8a enters object 770, is reflected once by each of opposite surfaces of object 770, exits object 770, enters polarizing beam splitter 736B, and exits polarizing beam splitter 736B as a component of output beam 722 polarized parallel to the plane of FIG. 8a. The component of input beam 12 reflected by polarizing beam splitter 536 and polarized orthogonal to plane of FIG. 8a enters object 770, is reflected once by each of opposite surfaces of object 770, exits object 770, enters polarizing beam splitter 736B, and exits polarizing beam splitter 736B as a component of output beam 722 polarized orthogonal to the plane of FIG. 8a.

Beam 722 is incident on polarizer 734 and exits polarizer 734 as beam 726. Polarizer 734 is orientated so as to produce beam 726 as a mixed beam. Beam 726 is detected by detector 758, preferably by photoelectric detection, to produce electrical interference or heterodyne signal 728. Heterodyne signal 728 is processed by electronic processor for the change in orientation of object 770 parallel to the plane of FIG. 8a.

Figure 8B:
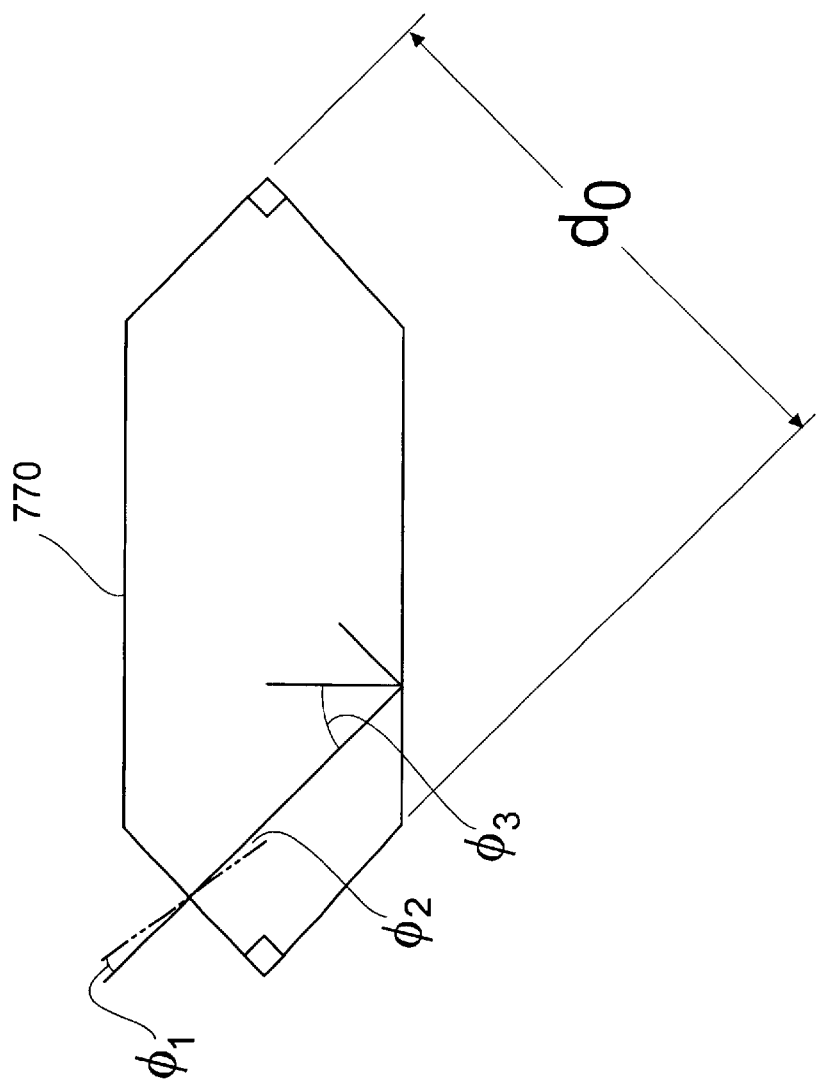
FIG. 8b is a diagram showing definitions of parameters used in the description the seventh embodiment.

The relationship between the phase $\Phi_7$ of heterodyne signal 728 and the angle of incidence $\phi_1$ at an entrance face of object 770 (see FIG. 8b) can be expressed to a good approximation by the formula $$\Phi_7 = k d_0 \sec\phi_2 (\sin\phi_3 + \cos\phi_3) \sin 2\phi_1 \qquad (23)$$

where $k=2\pi/\lambda$ is the wavenumber of input beam 12 and the other parameters defined in FIG. 8b.

Note that the value of the refractive index of object 770 only enters into the relationship of Eq. (23) as a high order effect such that the index of refraction need not be known to a high accuracy. Another important feature of the seventh embodiment is that the direction of beam 722 is independent of changes in the orientation of object 770. Further, the relative direction of propagation of the components of beam 722 is independent of the direction of propagation of input beam 12.

It will be evident to those skilled in the art that the aspect ratio of object 770 may be different from that shown in FIG. 8a with a corresponding increase in the even number of internal reflections of beams in object 770 without departing from the scope or spirit of the present invention.

Figure 9A:
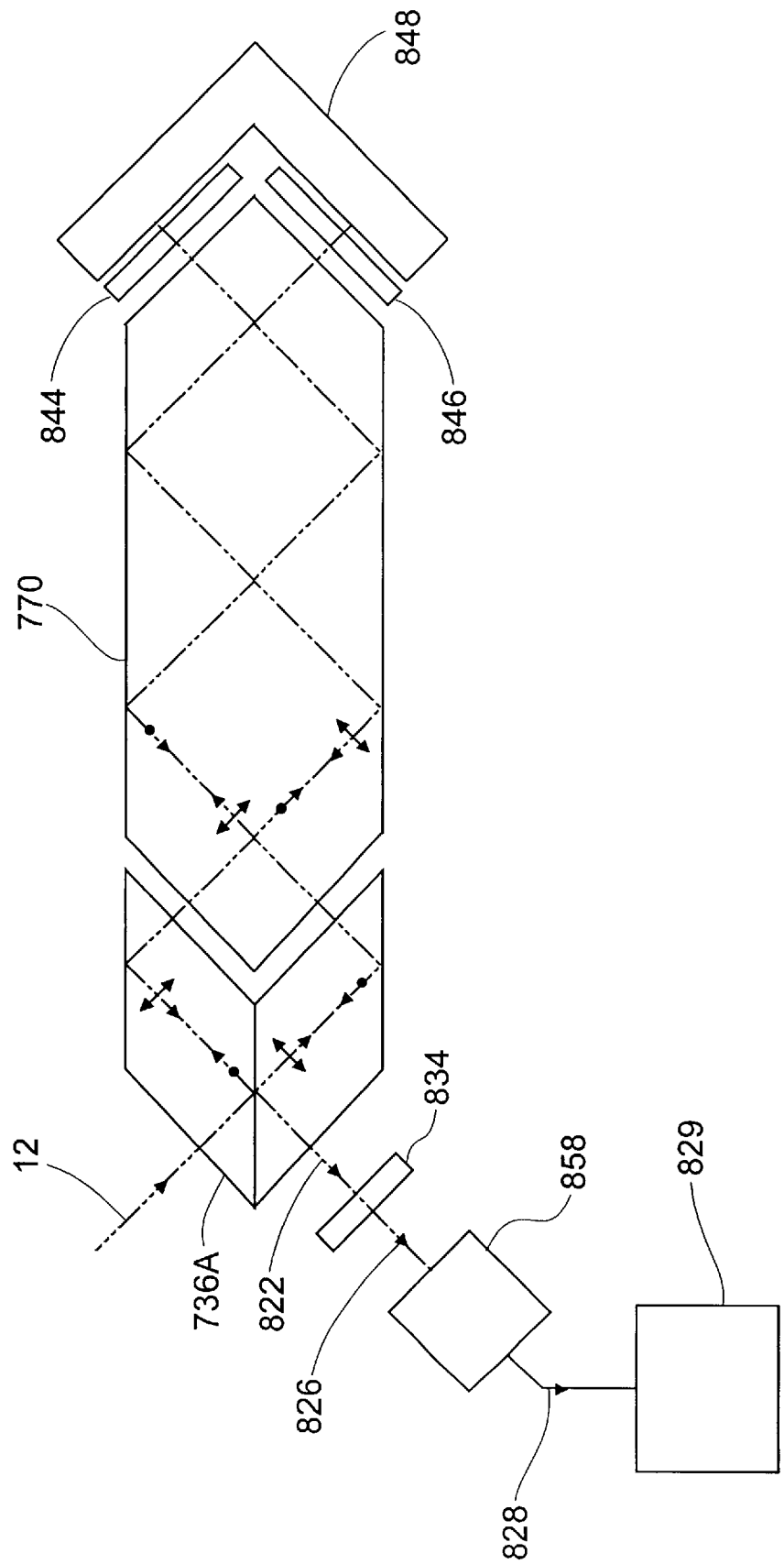
FIG. 9a is a diagrammatic elevational view of an eighth embodiment of the invention that measures changes in the orientation of an object in one plane.

The eighth embodiment is shown schematically in FIG. 9a. The eighth embodiment measures changes in the orientation of object 770 in the plane of FIG. 9a. Input beam 12 is incident on polarizing beam splitter 736A. The description of input beam 12 is the same as the description given for input beam 12 of the first embodiment.

The component of input beam 12 transmitted by polarizing beam splitter 736A and polarized parallel to plane of FIG. 9a makes a pass through object 770 to Porro prism 848, is reflected by Porro prism 848, makes a second pass back through object 770 to polarizing beam splitter 736A, and is reflected by polarizing beam splitter 736A as a component of beam 822 polarized perpendicular to the plane of FIG. 9a as a result of a double pass through quarter wave phase retardation plate 844. The descriptions of polarizing beam splitter 736A and object 770 of the eighth embodiment is the same as the descriptions given for polarizing beam splitter 736A and object 770 of the seventh embodiment.

The component of input beam 12 reflected by polarizing beam splitter 736A and polarized orthogonal to plane of FIG. 9a makes a pass through object 770 to Porro prism 848, is reflected by Porro prism 848, makes a second pass back through object 770 to polarizing beam splitter 736A, and is transmitted by polarizing beam splitter 736A as a component of beam 822 polarized parallel to the plane of FIG. 9a as a result of a double pass through quarter wave phase retardation plate 846. The descriptions of polarizing beam splitter 736A and object 770 of the eighth embodiment is the same as the descriptions given for polarizing beam splitter 736A and object 770 of the seventh embodiment.

Beam 822 is incident on polarizer 834 and exits polarizer 834 as beam 826. Polarizer 834 is orientated so as to produce beam 826 as a mixed beam. Beam 826 is detected by detector 858, preferably by photoelectric detection, to produce electrical interference or heterodyne signal 828. Heterodyne signal 828 is processed by electronic processor for the change in orientation of object 770 parallel to the plane of FIG. 9*a*.

The relationship between the phase $\Phi_8$ of heterodyne signal 828 and the angle of incidence $\phi_1$ at an entrance face of object 770 (see FIG. 8*b*) can be expressed to a good approximation by the formula $$\Phi_8 = 2kd_0 \sec\phi_2(\sin\phi_3 + \cos\phi_3)\sin 2\phi_1 \quad (24)$$

where $k=2\pi/\lambda$ is the wavenumber of input beam 12 and the other parameters defined in FIG. 8*b*.

An important feature of the eighth embodiment is an increased sensitivity by a factor of 2 for the detection of changes in orientation of object 770 over the corresponding sensitivity of the seventh embodiment. Note that the value of the refractive index of object 770 only enters into the relationship of Eq. (24) as a high order effect such that the index of refraction need not be known to a high accuracy. Another important feature of the seventh embodiment is that the direction of beam 722 is independent of changes in the orientation of object 770.

Figure 9B:
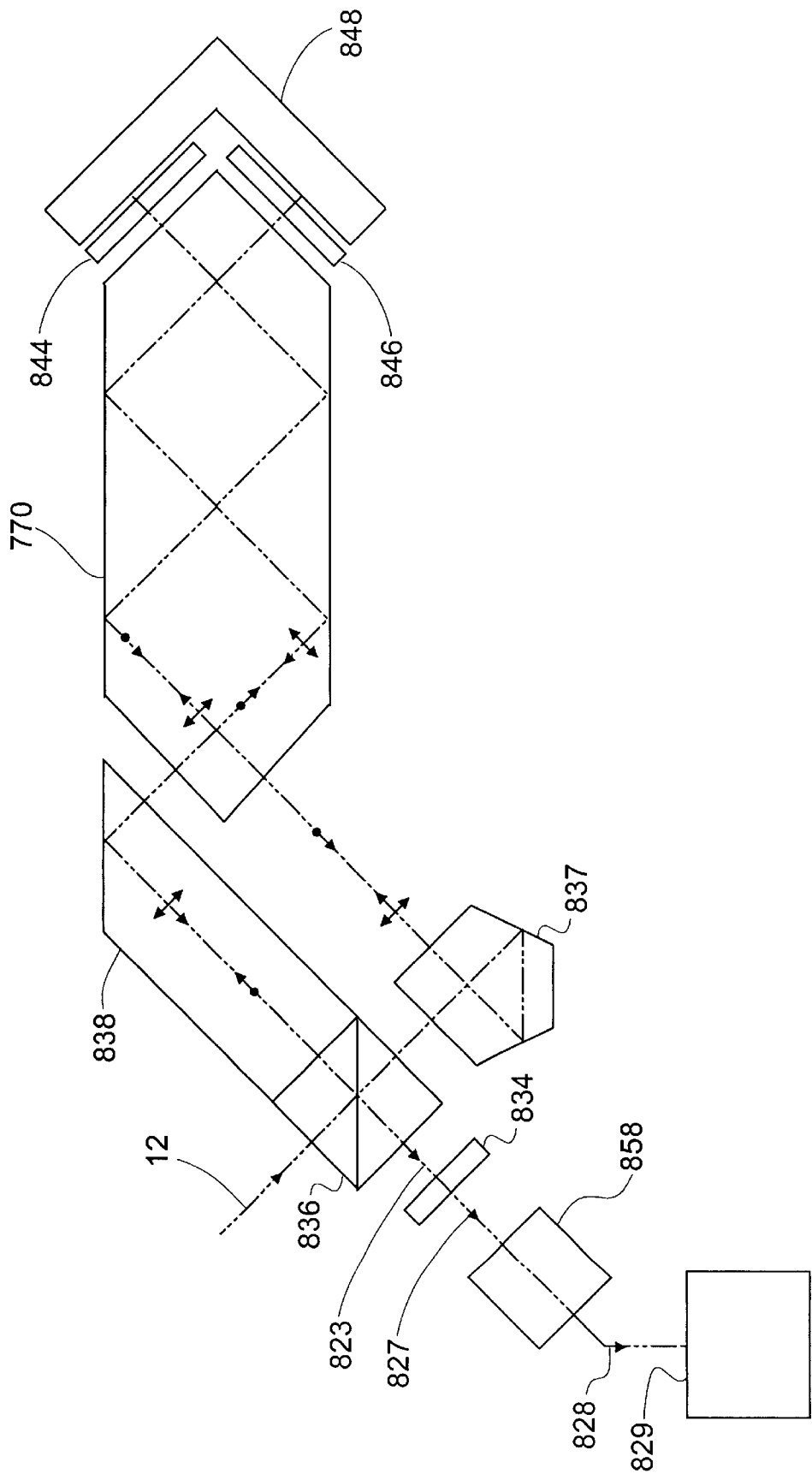
FIG. 9b is a diagrammatic elevational view of a first variant of the eighth embodiment of the invention that measures changes in the orientation of an object in one plane.

The first variant of eighth embodiment is shown schematically in FIG. 9*b*. The first variant of the eighth embodiment measures changes in the orientation of object 770 in the plane of FIG. 9*b*. The description of the first variant of the eighth embodiment is the same as corresponding portions of the description given for the eighth embodiment. The apparatus of the first variant of the eighth embodiment is the same as the apparatus of the eighth embodiment except for the replacement of polarizing beam splitter 736A with polarizing beam splitter 836, penta prism 837, and prism 838. The penta prism introduces an additional reflection for the component of beam 12 transmitted by polarizing beam splitter 836. As a consequence, the relative direction of propagation of the components of beam 823 is independent of the direction of propagation of input beam 12. The additional length of prism 838 is inserted so that the paths of components of beam 823 in an optical medium is the same.

The remaining description of the first variant of the eighth embodiment is the same as corresponding portions given for the eighth embodiment.

Figure 9C:
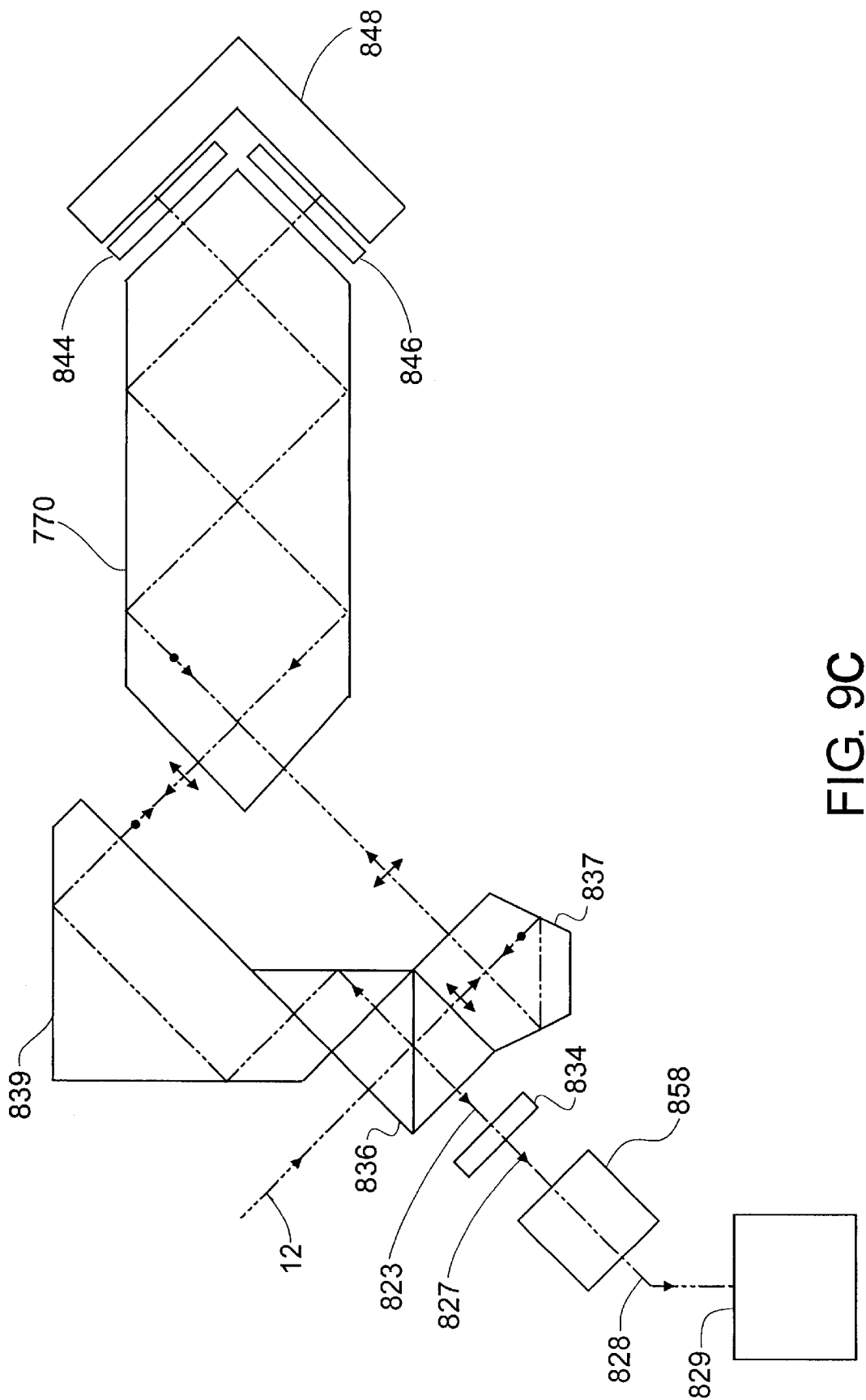
FIG. 9c is a diagrammatic elevational view of a second variant of the eighth embodiment of the invention that measures changes in the orientation of an object in one plane.

The second variant of eighth embodiment is shown schematically in FIG. 9*c*. The second variant of the eighth embodiment measures changes in the orientation of object 770 in the plane of FIG. 9*c*. The description of the second variant of the eighth embodiment is the same as corresponding portions of the description given for the first variant of the eighth embodiment. The apparatus of the second variant of the eighth embodiment is the same as the apparatus of the first variant of the eighth embodiment except for the replacement of prism 838 with Porro prism 839. The role of Porro prism 839 is functionally the same as prism 838 since Porro prism 839 introduces an additional even number of reflections over that resulting in prism 838 for beams corresponding to components of beam 12 reflected by polarizing beam splitter 836. As a consequence, the relative direction of propagation of the components of beam 823 is independent of the direction of propagation of input beam 12 for the second variant of the eighth embodiment. The additional length of Porro prism 839 is selected so that the paths of components of beam 823 in an optical medium is the same.

The remaining description of the second variant of the eighth embodiment is the same as corresponding portions of the description given for the first variant of the eighth embodiment.

What is claimed is:

1. Apparatus for measuring differences between the angular directions of travel of light beams, said apparatus comprising:

a multiple beam interferometer, said multiple beam interferometer being arranged to intercept the light beams to produce an output beam;

a lens for focusing said output beam to a spot in a detector plane;

a detector located in said detector plane for receiving said focused output beam and generating an electrical signal having a phase that varies in at least one plane in accordance with the angular separation between said light beams; and electronic means for receiving said electrical signal, determining said phase therefrom, and converting said phase to the angle separating said light beams.

2. The apparatus of claim 1 further including optical alignment means for assuring that at least one of said light beams enters said multiple beam interferometer aligned in a predetermined attitude with respect to said multiple beam interferometer such that said phase of said electrical signal is insensitive to changes in the angular direction of travel of said at least one of said light beams aligned in said predetermined attitude with respect to said multiple beam interferometer whereby said multiple beam interferometer serves as a reference from which an angular change of said other light beam may be measured.

3. The apparatus of claim 1 further including means for modulating an optical path length in said multiple beam interferometer so that said phase of said electrical signal varies with the frequency of modulation, the amplitude of said modulation, said optical path length in said multiple beam interferometer, and the angular separation between said light beams.

4. The apparatus of claim 3 further including means for providing a feedback signal derived from said electrical signal and for adjusting said optical path length of said multiple beam interferometer to optimize the magnitude of said electrical signal such that it is optimal at an optical path length where said optical path length of said multiple beam interferometer is an integer multiple of $2\pi$ at the operating wavelengths of said light beams.

5. The apparatus of claim 4 further including a distance measuring interferometer for measuring said optical path length of said multiple beam interferometer as said optical path length of said multiple beam interferometer is adjusted.

6. The apparatus of claim 5 wherein said electronic means further includes means for determining the relative angle between said light beams when said electrical signal has been optimized.

7. The apparatus of claim 1 wherein said multiple beam interferometer comprises at least one Fabry-Perot cavity.

8. The apparatus of claim 7 further including a rectangular aperture located forward of said focusing lens.

9. The apparatus of claim 1 wherein said light beams comprise orthogonally polarized beams.

10. The apparatus of claim 1 wherein said light beams have a frequency difference between them so that said electrical signal is a heterodyne signal.

11. Apparatus for measuring differences between the angular directions of travel of light beams, said apparatus comprising:

a multiple beam interferometer having an optical axis and at least one front and one rear partially transmissive element, said multiple beam interferometer being arranged to intercept the light beams so that the light beams are incident to said multiple beam interferometer front element at small angles with respect to said optical axis, pass through said front element, undergo multiple reflections in the space between the inner surfaces of said front and rear elements and then exit said rear element as an output beam;

a lens for focusing said output beam in a detector plane;

a detector located in said detector plane for receiving said focused output beam and generating an electrical signal having a property that varies in at least one plane in accordance with the difference in phase between adjacent transits of said light beams as they undergo multiple reflections between said front and rear elements and that changes with the difference in angular separation between said light beams; and electronic means for receiving said electrical signal, determining said property therefrom, and converting said property to an angle separating said light beams.

12. Method for measuring differences between the angular directions of travel of light beams, said apparatus comprising:

intercepting the light beams with a multiple beam interferometer to produce an output beam;

focusing said output beam to a spot in a detector plane;

receiving said focused output beam and generating an electrical signal having a phase that varies in at least one plane in accordance with the angular separation between said light beams; and receiving said electrical signal, determining said phase therefrom, and converting said phase to the angle separating said light beams.

* * * * *